US008070896B2

(12) United States Patent
Chen

(10) Patent No.: US 8,070,896 B2
(45) Date of Patent: Dec. 6, 2011

(54) METHOD FOR MAKING ILLUSTRATED CARD

(76) Inventor: Teng-Kuei Chen, Taipei (TW)

( * ) Notice: Subject to any disclaimer, the term of this patent is extended or adjusted under 35 U.S.C. 154(b) by 394 days.

(21) Appl. No.: 12/407,673

(22) Filed: Mar. 19, 2009

(65) Prior Publication Data

US 2009/0178761 A1 Jul. 16, 2009

Related U.S. Application Data

(63) Continuation-in-part of application No. 11/798,568, filed on May 15, 2007, now abandoned.

(51) Int. Cl.
*B29C 65/00* (2006.01)
*B32B 37/00* (2006.01)
*B44C 3/12* (2006.01)

(52) U.S. Cl. .......... 156/63; 156/297; 156/299; 156/302; 156/303; 156/552; 206/575; 434/84

(58) Field of Classification Search .................... 156/63, 156/297, 299, 302, 303, 552; 206/575; 434/84
See application file for complete search history.

(56) References Cited

U.S. PATENT DOCUMENTS

| | | | | |
|---|---|---|---|---|
| 3,797,875 | A * | 3/1974 | den Hamer | 294/1.1 |
| 5,423,411 | A * | 6/1995 | Kennett | 198/494 |
| 6,615,845 | B2 * | 9/2003 | Abraskin et al. | 132/200 |
| 2005/0258633 | A1 | 11/2005 | Hilicki et al. | |
| 2008/0041101 | A1 * | 2/2008 | Chen et al. | 63/26 |

* cited by examiner

*Primary Examiner* — Khanh P Nguyen
*Assistant Examiner* — Carson Gross
(74) *Attorney, Agent, or Firm* — Hershkovitz & Associates, LLC; Abraham Hershkovitz

(57) ABSTRACT

A method for making an illustrated card has providing a cardboard with at least one printed layer and ornamentation; positioning one ornamentation on one of the adhesive portions; pressing the ornamentation toward the adhesive portion; and repeating positioning one ornamentation on one of the adhesive portions and pressing the ornamentation toward the adhesive portion. The illustrated card allows users especially children to make the illustrated card by themselves and children can be trained to arrange the ornamentation with different colors for improving chromatological and fine-motor skills.

1 Claim, 11 Drawing Sheets

METHOD FOR MAKING ILLUSTRATED CARD

The present invention is a continuation-in-part application that claims the benefit of the U.S. patent application Ser. No. 11/798,568 filed on May 15, 2007, now abandoned the disclosure of which is expressly incorporated by reference herein in its entirety.

BACKGROUND OF THE INVENTION

1. Field of Invention

The present invention relates to a method for making an illustrated card, and more particularly to a method for making an illustrated card, which trains children to arrange ornamentation on the illustrated card to improve chromatology and fine motor skills.

2. Description of the Related Art

An illustrated card can be used as a greeting card or a decoration on a wall. A conventional illustrated card has two surfaces. However, at least one surface has words or patterns, so users cannot make and arrange the pattern or color on the surface by themselves. Thus, the conventional illustrated card inaccessible to users.

Additionally, children usually use color pens, paints, crayons or the like for coloring. They usually fill colors on a coloring book that has a pattern contour on each page so that they can recognize and distinguish various colors and apply corresponding tones. However, the coloring book cannot be made to have a three-dimensional structure, so the coloring book does not hold children's attention for a long time. Furthermore, children using color pens, paints, crayons or the like may dirty their hands and clothes and annoy their parents.

To overcome the shortcomings, the present invention provides a method for making an illustrated card to mitigate or obviate the aforementioned.

SUMMARY OF THE INVENTION

The primary objective of the present invention is to provide a method for making an illustrated card, which trains children to arrange ornamentation on the illustrated card to improve their sense of chromatology.

To achieve the objective, the method for making an illustrated card in accordance with the present invention comprises providing a cardboard with at least one printed layer and ornamentation; positioning one ornamentation on one of the adhesive portions; pressing the ornamentation toward the adhesive portion; and repeating positioning one ornamentation on one of the adhesive portions and pressing the ornamentation toward the adhesive portion.

The illustrated card allows users, especially children, to make the illustrated card by themselves and children can be trained to arrange the ornamentation with different colors to improve their sense of chromatology.

Other objectives, advantages and novel features of the invention will become more apparent from the following detailed description when taken in conjunction with the accompanying drawings.

DETAILED DESCRIPTION OF THE INVENTION

Figure 1A:
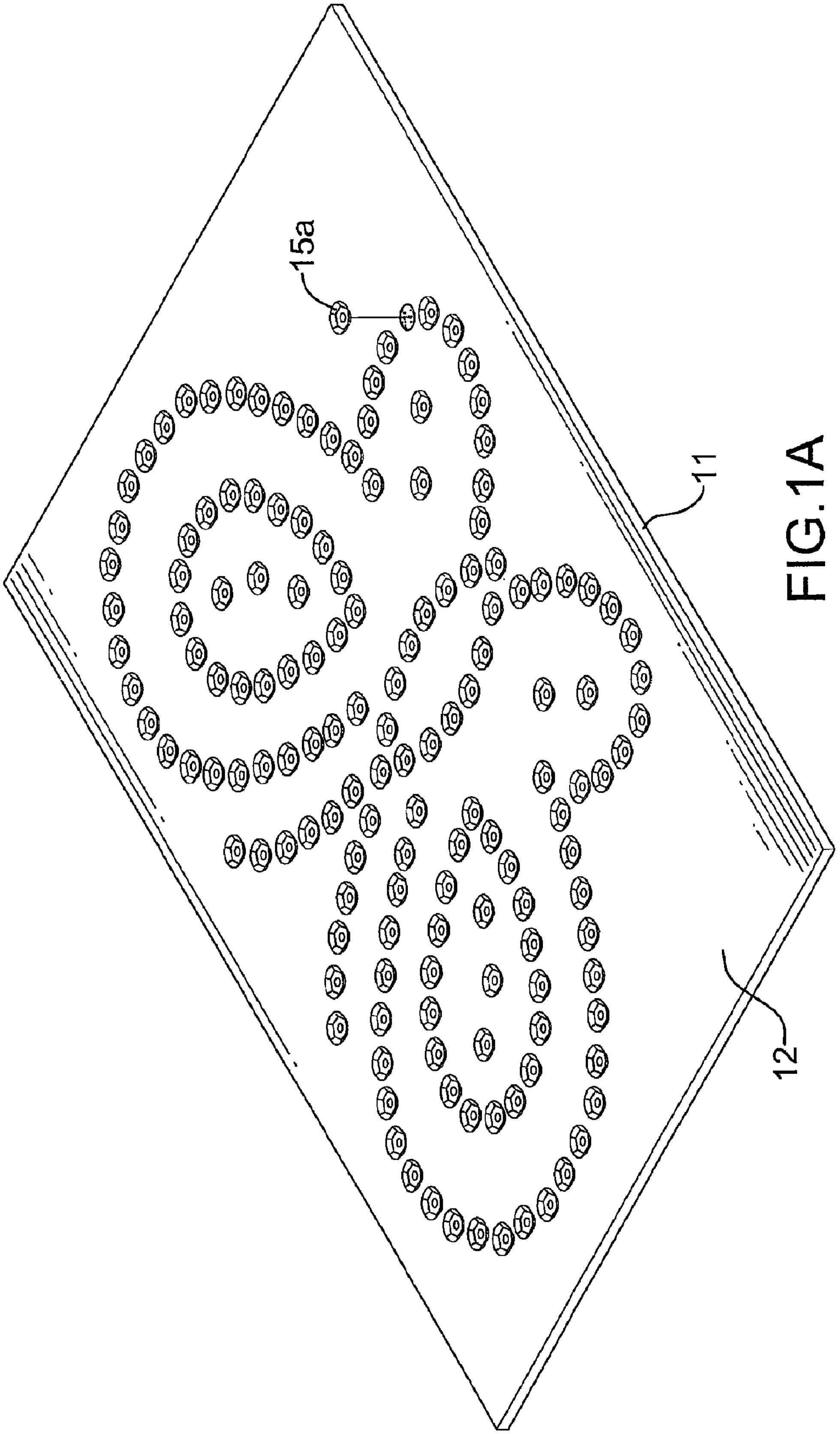
FIG. 1A is a perspective view of an illustrated card with sequin in accordance with the present invention.

With reference to FIG. 1A, an illustrated card in accordance with the present invention has a cardboard (11), at least one printed layer and ornamentation.

The cardboard (11) has two surfaces.

Each of the at least one printed layer is formed on one of the surfaces of the cardboard (11) and has a pattern ink layer (12) and multiple adhesive portions (14).

Figure 2:
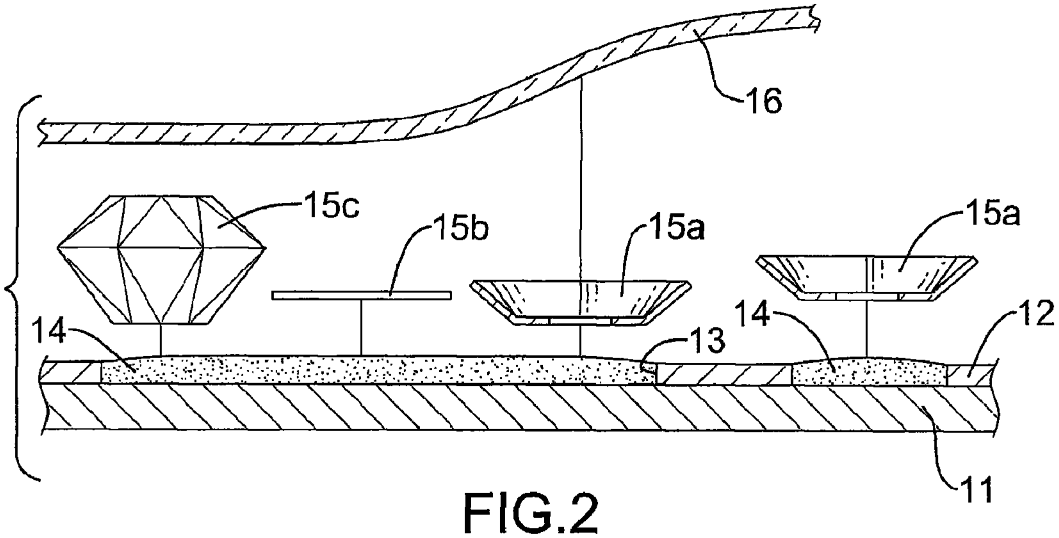
FIG. 2 is an exploded cross sectional side view of a first embodiment of the illustrated card in FIG. 1D with a release paper.
Figure 4:
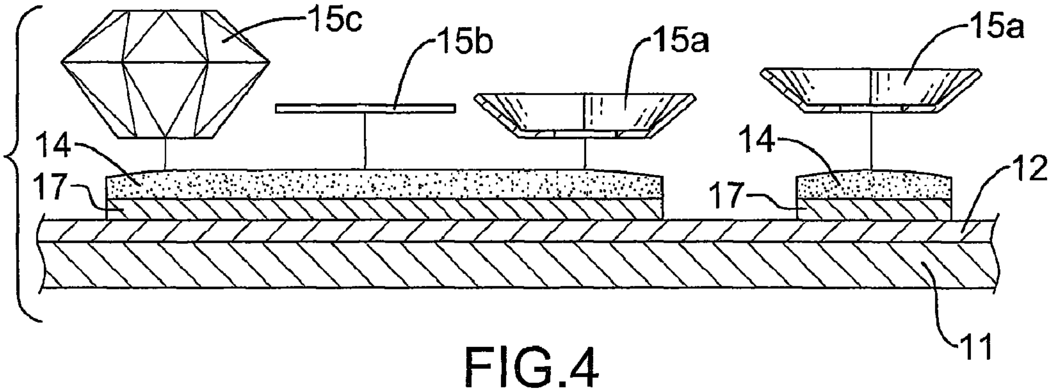
FIG. 4 is an exploded cross sectional side view of a third embodiment of the illustrated card in FIG. 1D.

With further reference to FIGS. 2 and 4, the pattern ink layer (12) arranges a pattern and may be monochrome or polychrome. The pattern can be a completed figure such as characters, words, a human figure, an animal, a plant or the like or a part of the pattern such as a skirt or hair of the human figure or petals of the plant. The pattern ink layer (12) of a first embodiment of the illustrated card has multiple recesses (13). The recesses (13) are formed in the pattern ink layer (12) to arrange the pattern. The pattern ink layer (12) of a third embodiment of the illustrated card has multiple pigment portions (17). The pigment portions (17) are mounted on the pattern ink layer (12) to arrange the pattern.

Figure 3:
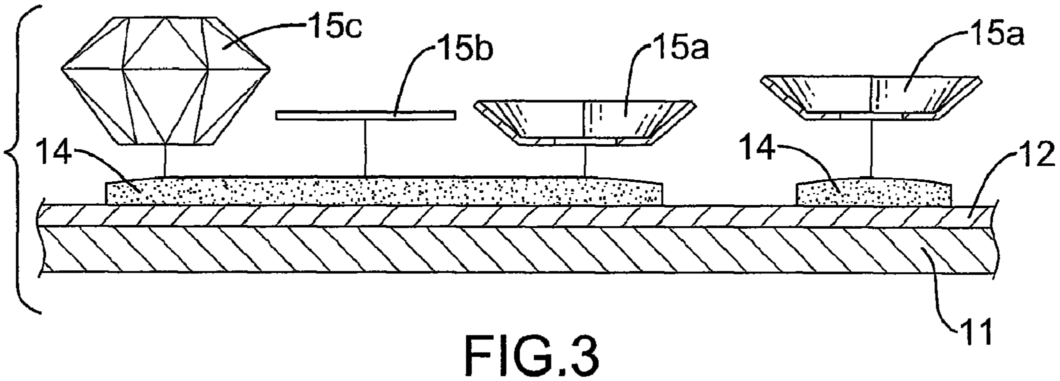
FIG. 3 is an exploded cross sectional side view of a second embodiment of the illustrated card in FIG. 1D.

With further reference to FIG. 3, the adhesive portions (14) are attached to the pattern ink layer (12), are mounted respectively in the recesses (13) in the first embodiment of the illustrated card, are mounted directly on the pattern ink layer (12) to arrange the pattern in a second embodiment of the illustrated card or are mounted respectively on the pigment portions (17) in the third embodiment of the illustrated card.

Figure 1B:
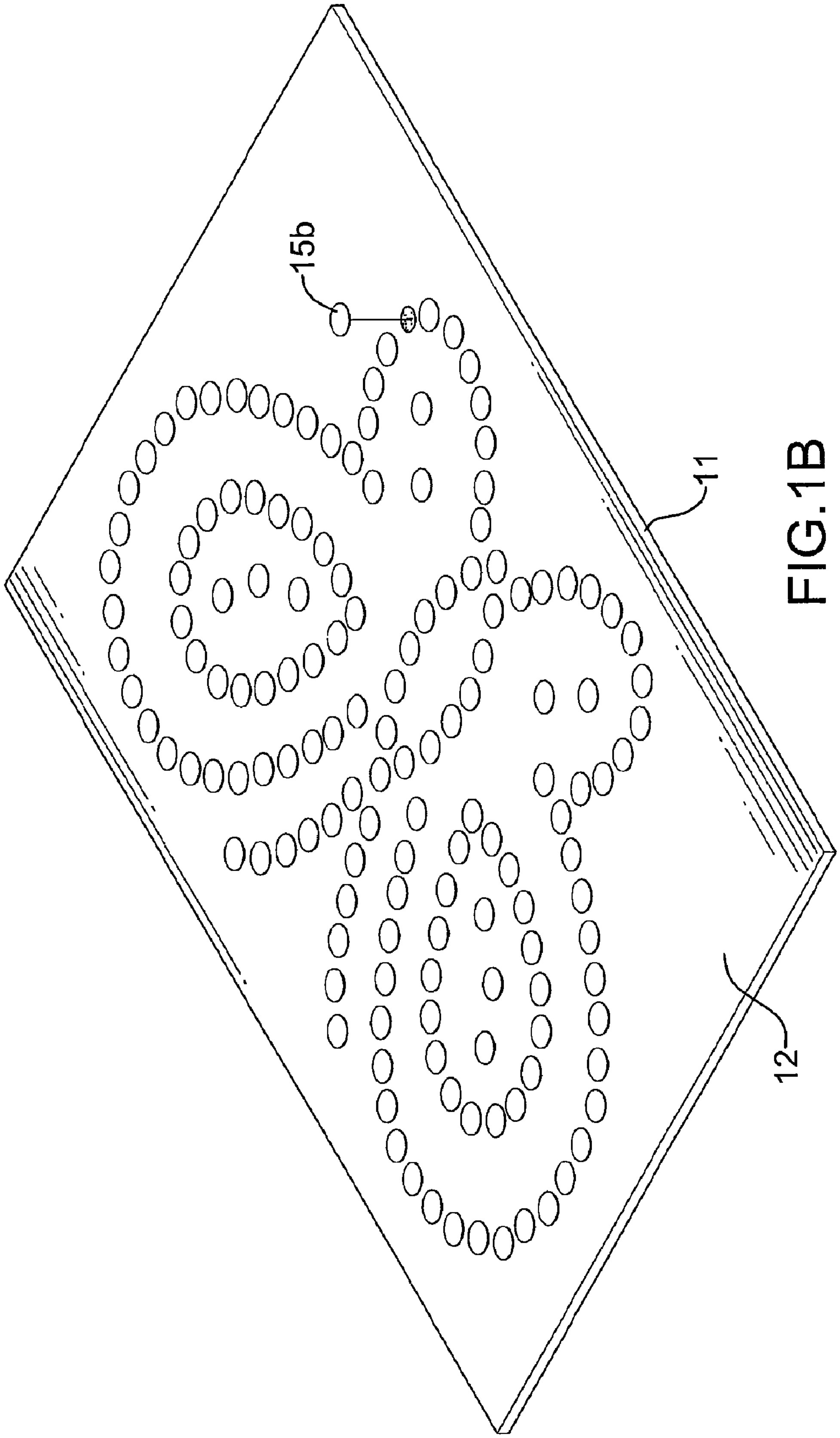
FIG. 1B is a perspective view of an illustrated card with paillettes in accordance with the present invention.
Figure 1C:
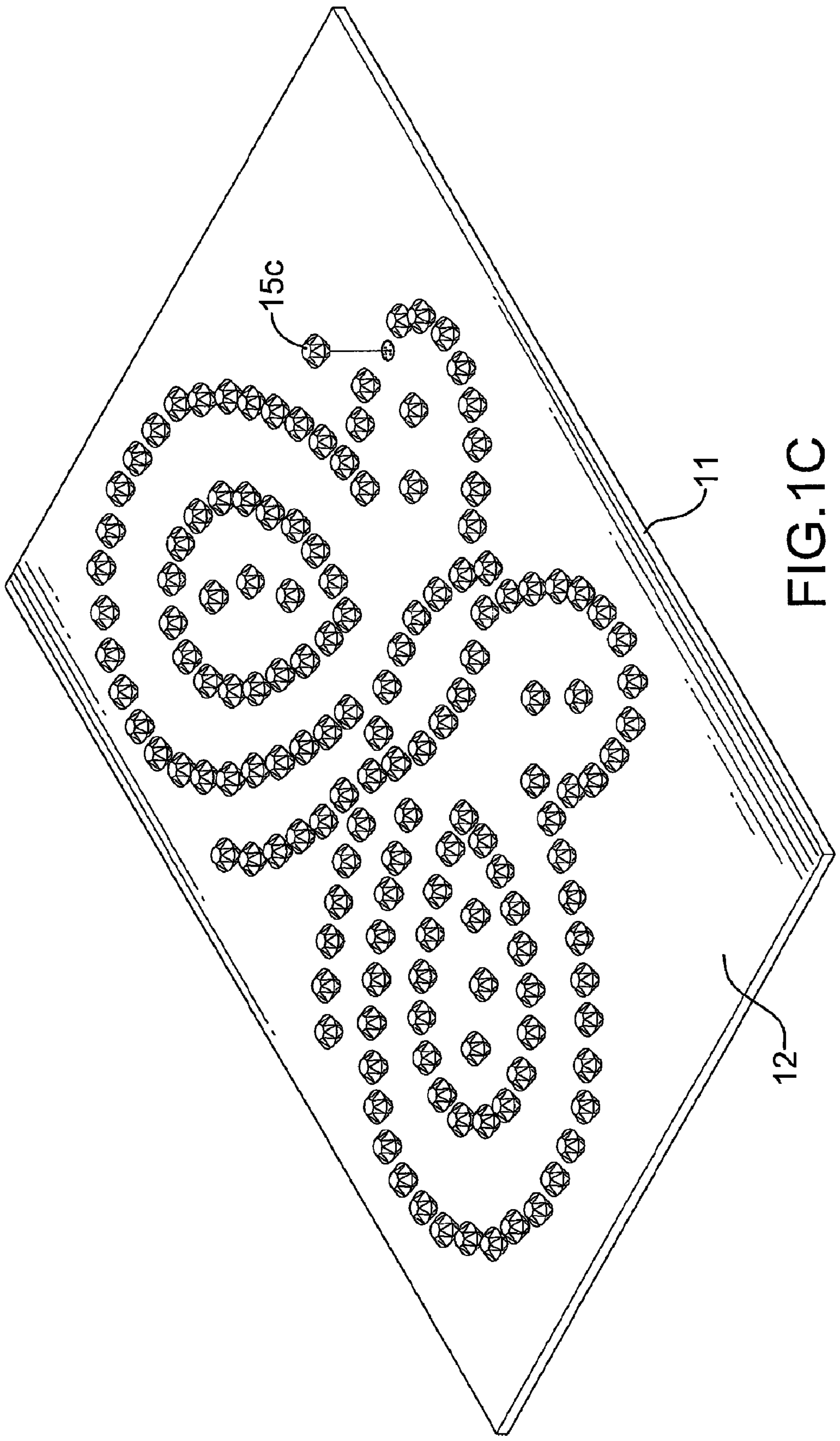
FIG. 1C is a perspective view of an illustrated card with rhinestone in accordance with the present invention.

With further reference to FIGS. 1B and 1C, the ornamentation is mounted in the adhesive portion (14) and has various colors, so one adhesive portion (14) holds at least one ornamentation. The ornamentation may comprise sequins (15*a*), paillettes (15*b*), rhinestones (15*c*), a combination thereof or the like and may be circular, star-shaped, flower-shaped, preformed animals, plants or the like and may be flat or three-dimension.

Figure 1D:
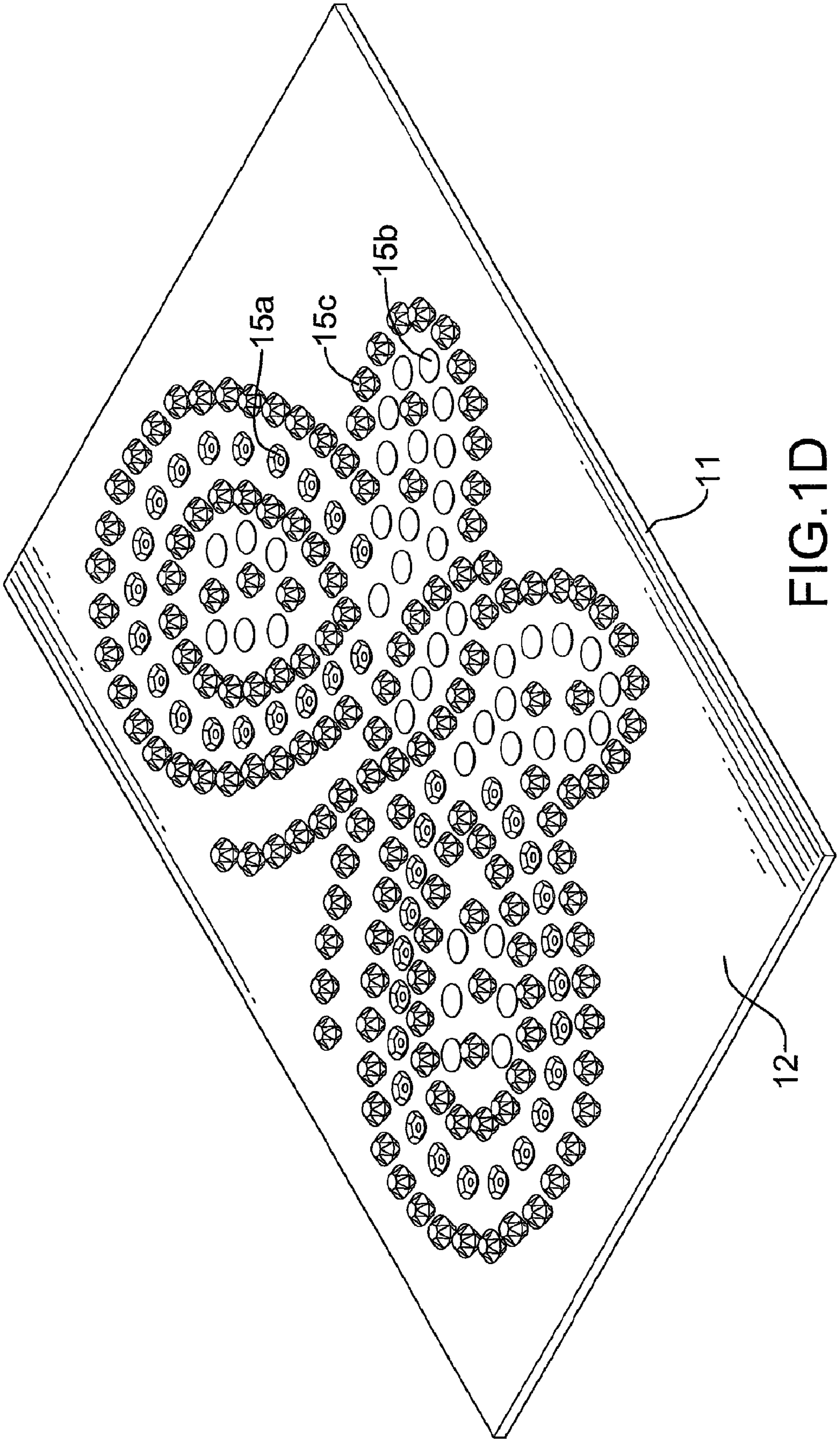
FIG. 1D is a perspective view of an illustrated card with sequin, paillettes and rhinestone in accordance with the present invention.

With further reference to FIG. 1D, sequins (15*a*), paillettes (15*b*) and rhinestones (15*c*) may be alternatively arranged and adhere on one of the adhesive portions (14) as also shown in FIGS. 2 to 4. Therefore, the user can make a colorful and varied illustrated card.

Before the ornamentation are mounted on the adhesive portions (14), the at least one printed layer can be covered by a release paper (16) as shown in FIG. 2.

Figure 5:
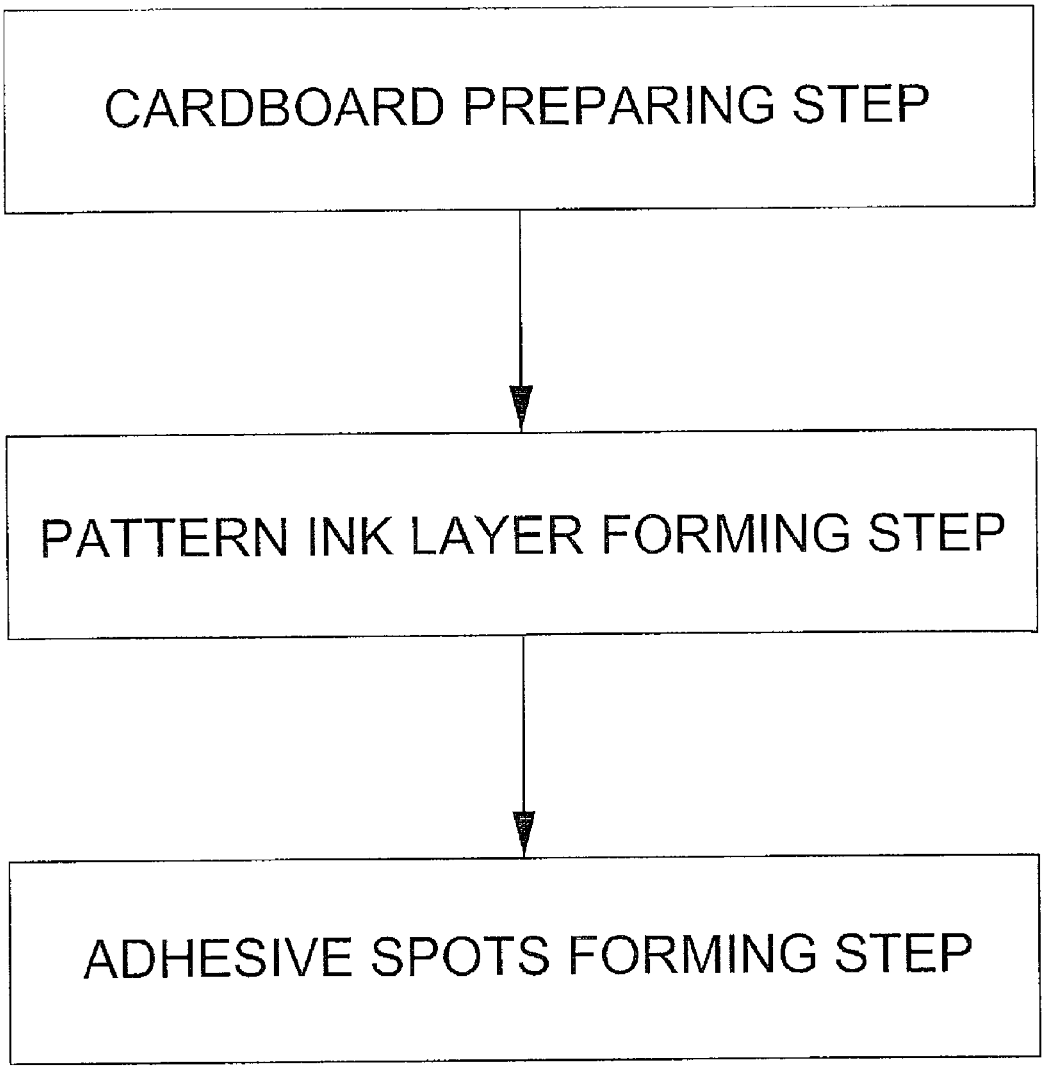
FIG. 5 is a flow chart of a method for producing an illustrated card in accordance with the present invention.

With further reference to FIG. 5, a method for producing the illustrated card in accordance with the present invention has a cardboard preparing step, a pattern ink layer forming step and an adhesive portions forming step.

The cardboard preparing step has preparing a cardboard (11).

The pattern ink layer forming step has printing ink on at least one surface of the cardboard (11) to form a pattern ink layer (12). The ink covers part of the surface of the cardboard (11) to form multiple recesses (13) in the first embodiment of the illustrated card. The ink may cover a whole surface of the cardboard (11) when the second and the third embodiments of the illustrated card are produced. The pattern ink layer (12) forming step further has printing multiple pigments on the pattern ink layer (12) after printing the ink to form the pattern ink layer (12) with multiple pigment portions (17).

The adhesive portions forming step has printing adhesives to form multiple adhesive portions (14) on the pattern ink layer (12) and each adhesive portions (14) receives at least one ornamentation. The adhesives are printed respectively in the recesses (13) when the first embodiment of the illustrated card is produced. The adhesives are printed directly on the pattern ink layer (12) when the second embodiment of the illustrated card is produced. The adhesives are printed respectively on the pigment portions (17) when the third embodiment of the illustrated card is produced.

The illustrated card allows users, especially children, to make the illustrated card by themselves and children can be trained to arrange the ornamentation with different colors to improve their sense of chromatology. Additionally, the users can mount directly the ornamentation on the adhesive portions (14) without dirtying their hands or clothes, so is convenient.

Figure 6:
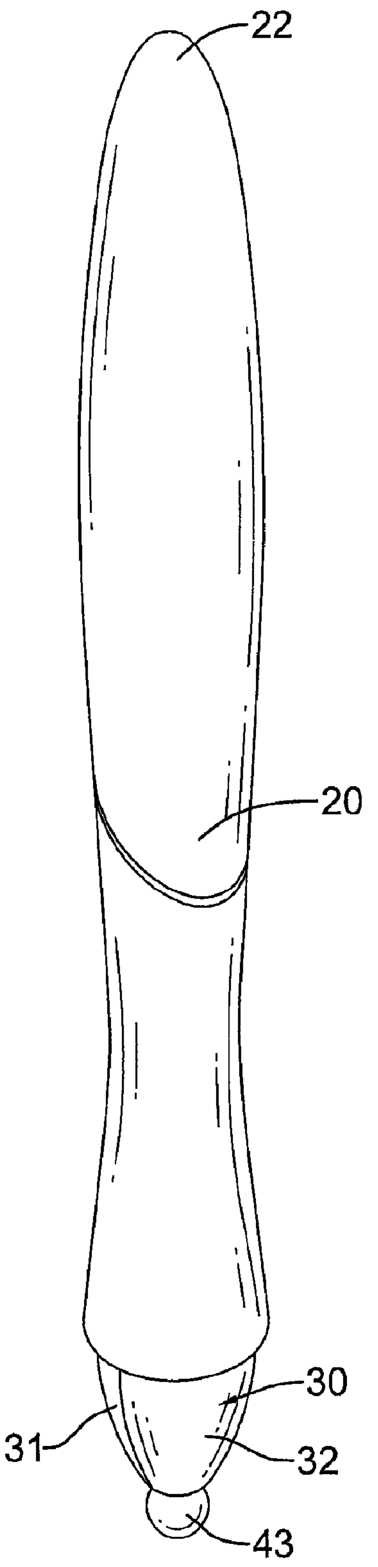
FIG. 6 is a perspective view of a stylus in accordance with the present invention for making an illustrated card of the present invention.

With further reference to FIG. 6, a stylus in accordance with the present invention for making an illustrated card has a shaft (20).

The shaft (20) is longitudinal and pen-like so users may hold the shaft (20) as simply as they hold a pen. The shaft (20) has an adhesive end and a blunt end (22).

Figure 7:
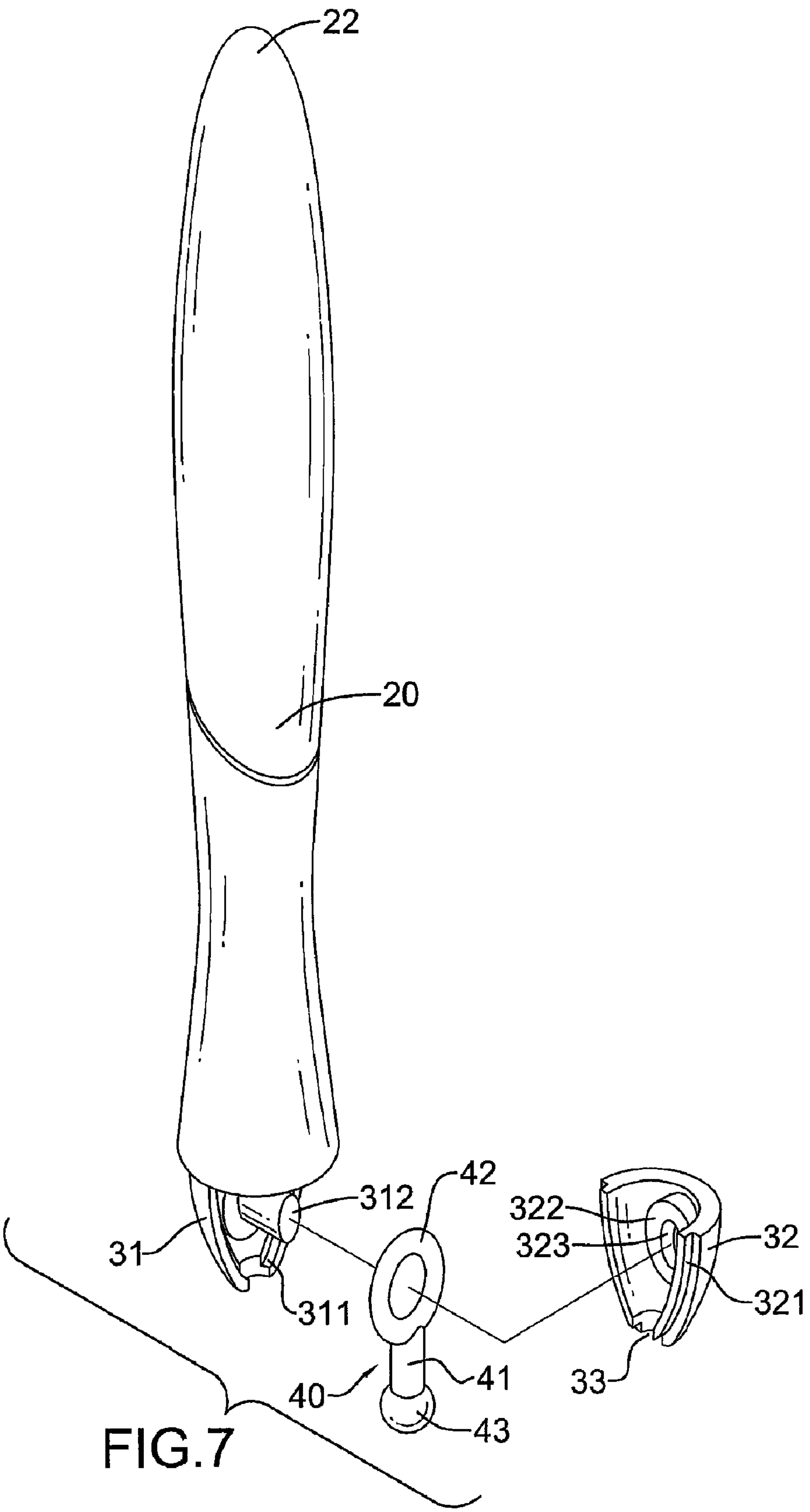
FIG. 7 is an exploded perspective view of the stylus in FIG. 6.

With further reference to FIG. 7, the adhesive end has a fastener (30) and an applicator (40).

The fastener (30) is conical, protrudes from the adhesive end of the shaft (20) and has an inner space, an enlarged end, a narrow end, a first half (31) and a second half (32).

The enlarged end is mounted on the adhesive end of the shaft (20).

The narrow end has a through hole (33). The through hole (33) is defined through the narrow end and communicates with the inner space of the fastener (30).

The first half (31) is formed integrally on the adhesive end of the shaft (20) and has an inner surface and two opposite side edges. The inner surface may have a tip (312) or a cap. Each of the side edges has a first detent (311). The first detent (311) is formed in the side edge. The tip (312) protrudes from the inner surface. The cap protrudes from the inner surface and has a mounting hole. The mounting hole is formed in the cap.

The second half (32) is combined detachably with the first half (31) and has an inner surface and two opposite side edges. The inner surface may have a tip or a cap (322). The tip protrudes from the inner surface. The cap (322) protrudes from the inner surface has a mounting hole (323). The mounting hole (323) is formed in the cap (322) and corresponds to the tip (312) of the first half (31) to receive the tip (312), so the first and second half (31, 32) are combined securely. Each of the side edges has a second detent (321). The second detent (321) is formed on the side edge and is mounted in one of the first detents (311) of the first half (31) to fasten the two halves (31, 32) firmly.

The applicator (40) is tacky, is made of resin such as thermoplastic resin (TPR) or silicone, is fastened by the fastener (30), is mounted in the inner space of the fastener (30) and protrudes from the through hole (33). The applicator (40) has a cylindrical segment (41), a fastening ring (42) and a tacky end (43). The cylindrical segment (41) is mounted in the inner space of the fastener (30) and has a proximal end and a distal end. The fastening ring (42) is formed integrally from the proximal end of the cylindrical segment (41) and has a fastening hole. The fastening hole is mounted around the protrusion (312) of one of the first and second halves (31, 32) to fasten the applicator (40) to the fastener (30). The tacky end (43) protrudes from the distal end of the cylindrical segment (41), is mounted out of the through hole (33) of the fastener (30) and corresponds to the ornamentation to pick up the ornamentation. The tacky end (43) may have various diameters corresponding to various dimension of the ornamentation.

The applicator (40) has a less stickiness than the adhesive portion (14), so the applicator (40) temporarily sticks the ornamentation and transfer the ornamentation to the adhesive portion (14) of the printed layer and the ornamentation will be detached from the applicator (40) and stick onto the adhesive portion (14).

Figure 10:
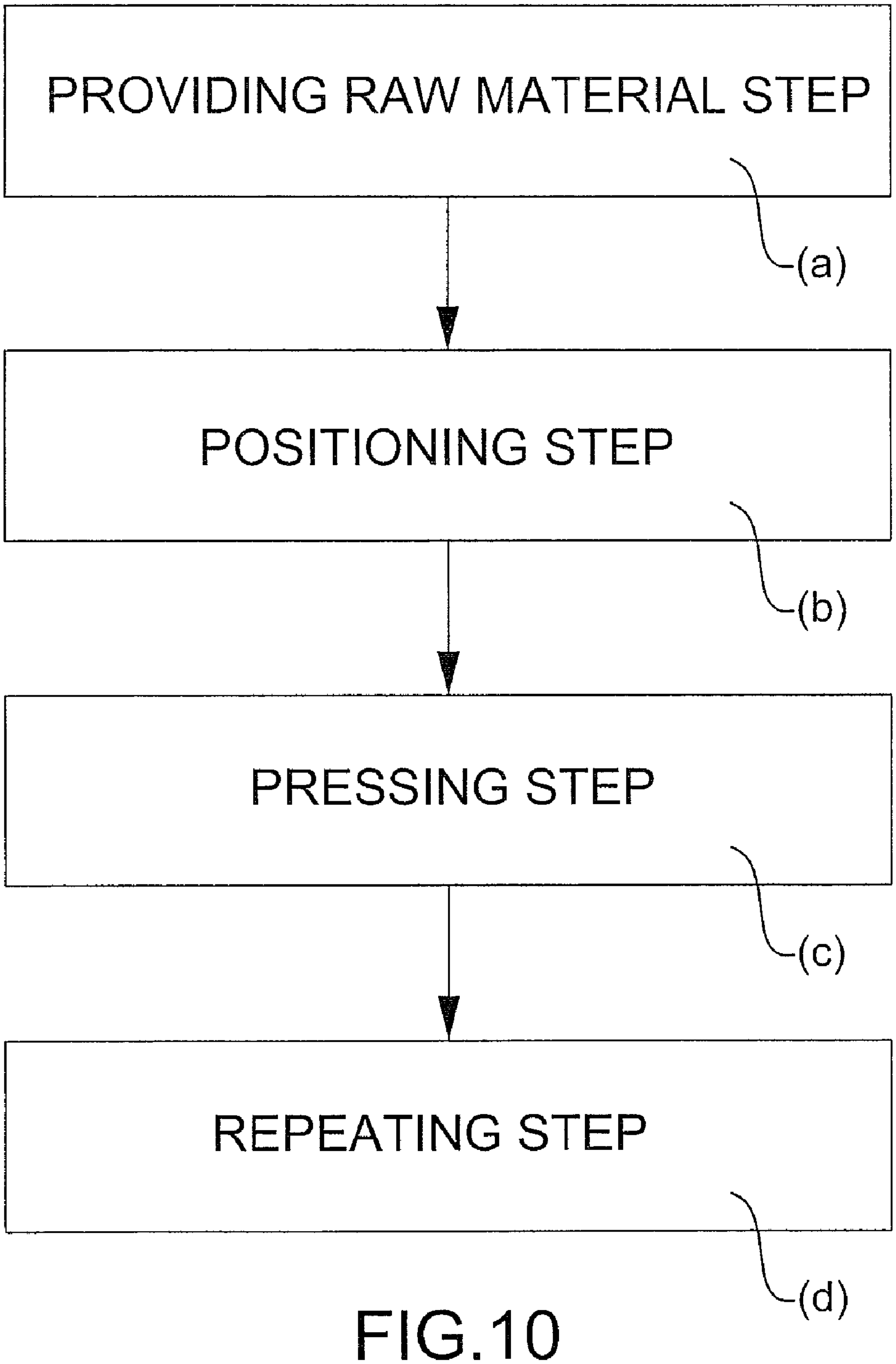
FIG. 10 is a flow chart of a method for making the illustrated card in FIG. 1 with the stylus in FIG. 6.

With further reference to FIG. 10, a method for making an illustrated card in accordance with the present invention comprises providing raw material step (a), a positioning step (b), a pressing step (c) and a repeating step (d).

The providing raw material step (a) comprises providing a cardboard (11) with at least one printed layer, ornamentation and a stylus as previously described. The positioning step (b) comprises putting the ornamentation on one of the adhesive portions (14).

Figure 8:
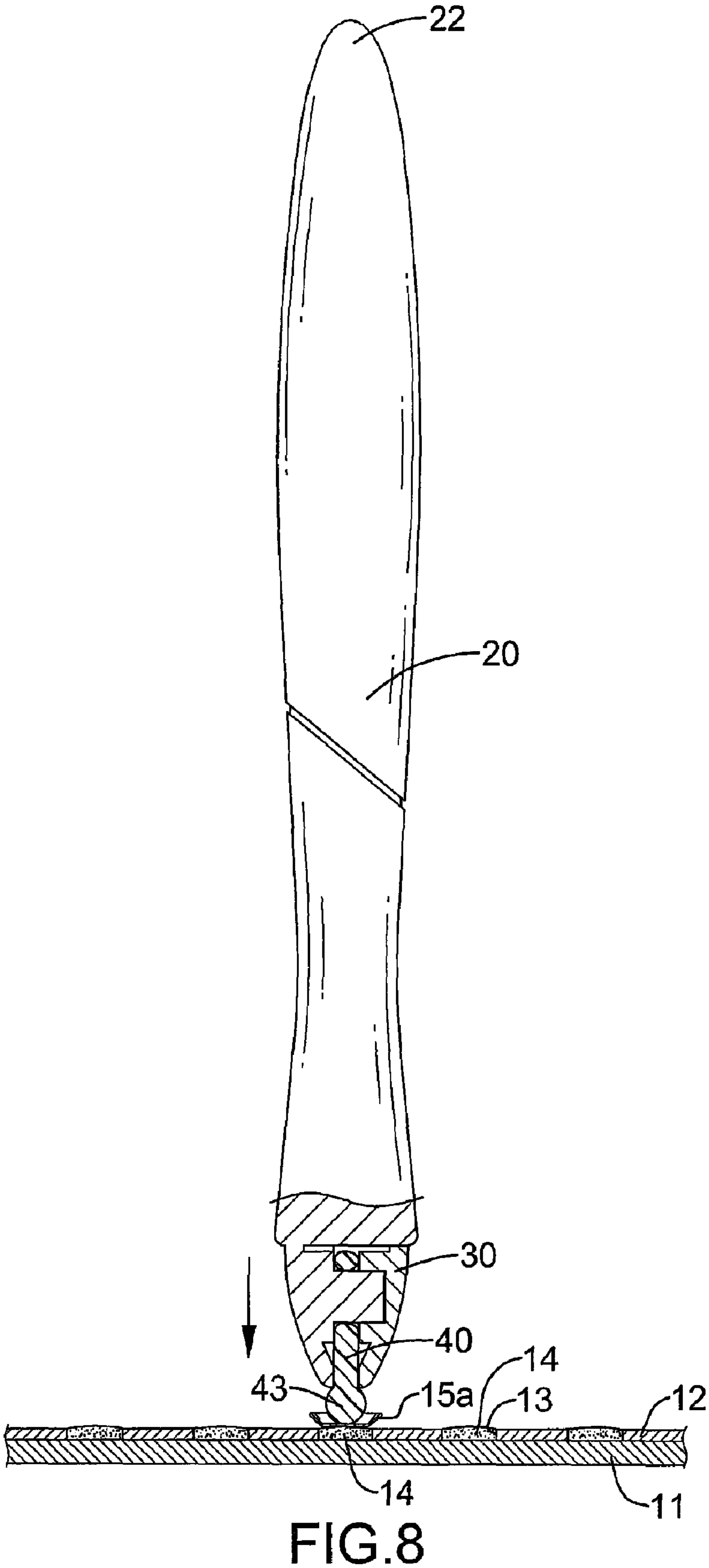
FIG. 8 is a side view in partial section of the stylus in FIG. 6 showing an adhesive end used to add an ornamentation to the illustrated card.

With further reference to FIG. 8, in this embodiment, the positioning step (b) comprises using the tacky end (43) of the adhering element (40) of the stylus to adhere to one ornamentation and putting the ornamentation on one adhesive portion (14). Because the adhesive portion (14) has a stronger stickiness than the adhering element (40), the ornamentation will stay on the adhesive portion (14).

The pressing step (c) comprises pressing the ornamentation toward the adhesive portion (14).

Figure 9:
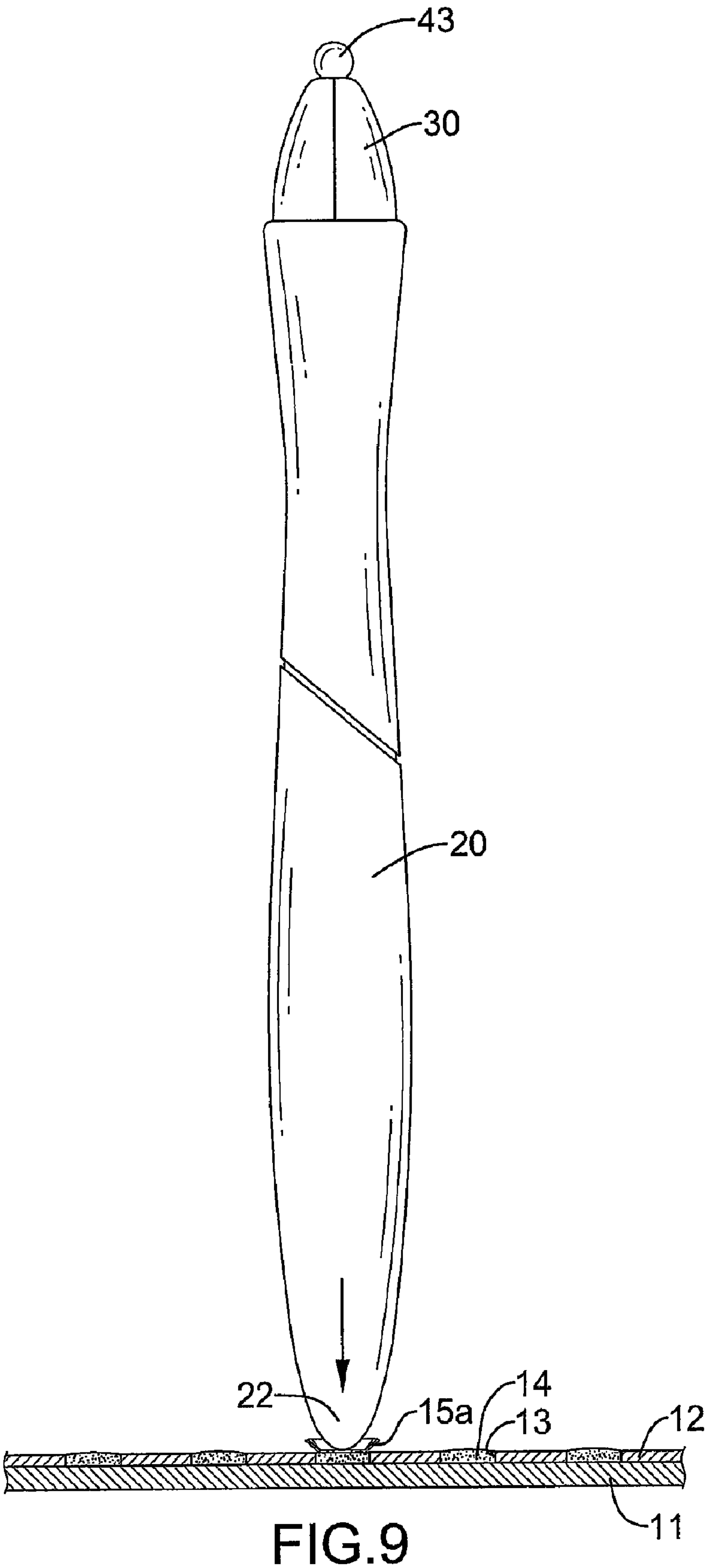
FIG. 9 is a perspective view of the stylus in FIG. 6 showing a blunt end pressing an ornamentation toward the illustrated card.

With further reference to FIG. 9, in this embodiment, the pressing step (c) comprises using the blunt end (22) of the stylus to press the ornamentation toward the adhesive portion (14), so the ornamentation can adhere firmly to the illustrated card.

The repeating step (d) comprises repeating the positioning step (b) and the pressing step (c) to selectively adhere ornamentation to the adhesive portions (14).

The ornamentation can be adhered more easily and rapidly by the applicator (40) than by a user's hand. Furthermore, the stylus acts a pre-pencil for improved fine motor control, combined with limited adhesive portions (14) size reduces mess and improves accuracy so improving self-achievement without associated mess of paints, crayons, glue and pencils. Thus, using the stylus of the present invention to make the illustrated card is convenient.

Even though numerous characteristics and advantages of the present invention have been set forth in the foregoing description, together with details of the structure and function of the invention, the disclosure is illustrative only. Changes may be made in detail, especially in matters of shape, size and arrangement of parts within the principles of the invention to the full extent indicated by the broad general meaning of the terms in which the appended claims are expressed.

What is claimed is:

1. A method for making an illustrated card, comprising steps of:

providing a cardboard with at least one printed layer, a plurality types of ornamentation and a stylus, wherein:
the cardboard has two surfaces;
the at least one printed layer is formed on one of the two surfaces of the cardboard and has
a pattern ink layer arranging a pattern and being mounted on a corresponding one of the two surfaces; and
multiple adhesive portions being attached to the pattern ink layer; and
the stylus comprises a shaft having
a blunt end; and
an adhesive end having
a fastener protruding from the adhesive end of the shaft; and
an applicator being made of resin and fastened by the fastener and having
a cylindrical segment mounted in an inner space of the fastener and having a proximal end and a distal end; and
a tacky end protruding from the distal end of the cylindrical segment and mounted out of the fastener;
using the tacky end of an adhering element of the stylus to adhere to one of the plurality types of ornamentation;
putting the one of the plurality types of ornamentation on one of the adhesive portions, each adhesive portion holding at least one type of ornamentation;
using the blunt end of the stylus to press the one of the plurality types of ornamentation toward the adhesive portion; and
repeating using the stylus to selectively adhere the plurality types of ornamentation on the adhesive portions, and using the stylus to press the one of the plurality types of ornamentation toward the adhesive portion,
wherein:
the fastener of the adhesive end has the inner space;
an enlarged end mounted on the adhesive end of the shaft; and
a narrow end having a through hole defined through the narrow end and communicating with the inner space of the fastener; and
the applicator is mounted in the inner space of the fastener and partially protrudes from the through hole of the narrow end of the fastener; and
wherein:
the fastener is conical and further has two halves combined detachably to each other, wherein
one of the halves is formed inmlly on the adhesive end of the shaft and has
an inner surface having a protrusion protruding from the inner surface; and
two side edges, each side edge having a first detent formed in the edge; and
the other half has
an inner surface having a cap protruding from the inner surface having a mounting hole formed in the cap and corresponding to the protrusion of the one of the halves to receive the protrusion to combine the halves securely; and
two opposite side edges, each side edge having a second detent formed on the side edge and securely mounted in one of the first detents to fasten the two halves firmly; and
the applicator further has a fastening ring formed integrally from the proximal end of the cylindrical segment and having fastening hole mounted around the protrusion of the one of the halves to fasten the applicator to the fastener.

* * * * *